US008521821B2

(12) United States Patent  (10) Patent No.: US 8,521,821 B2
van der Horst et al.  (45) Date of Patent: Aug. 27, 2013

(54) ENCRYPTED EMAIL BASED UPON TRUSTED OVERLAYS

(75) Inventors: Timothy W. van der Horst, Provo, UT (US); Kent Eldon Seamons, Cedar Hill, UT (US)

(73) Assignee: Brigham Young University, Provo, UT (US)

( * ) Notice: Subject to any disclaimer, the term of this patent is extended or adjusted under 35 U.S.C. 154(b) by 880 days.

(21) Appl. No.: 12/406,001

(22) Filed: Mar. 17, 2009

(65) Prior Publication Data

US 2010/0241847 A1 Sep. 23, 2010

(51) Int. Cl.
G06F 15/16 (2006.01)

(52) U.S. Cl.
USPC ........... 709/206; 713/150; 713/151; 713/152; 345/629; 345/630; 345/631; 345/632; 705/50; 705/51

(58) Field of Classification Search
USPC .................. 705/51; 713/150–155; 345/629; 709/206
See application file for complete search history.

(56) References Cited

U.S. PATENT DOCUMENTS

| | | | |
|---|---|---|---|
| 5,276,735 A | | 1/1994 | Boebert et al. |
| 5,596,718 A | * | 1/1997 | Boebert et al. .................. 726/16 |
| 5,664,058 A | | 9/1997 | Vysotsky |
| 5,796,394 A | * | 8/1998 | Wicks et al. .................. 715/751 |
| 5,822,435 A | * | 10/1998 | Boebert et al. ................ 713/192 |
| 5,953,420 A | | 9/1999 | Matyas |
| 5,960,080 A | * | 9/1999 | Fahlman et al. ............... 380/252 |
| 5,960,411 A | | 9/1999 | Hartman et al. |
| 6,012,144 A | | 1/2000 | Pickett |
| 6,061,665 A | | 5/2000 | Bahreman |
| 6,212,633 B1 | * | 4/2001 | Levy et al. ..................... 713/153 |
| 6,223,213 B1 | * | 4/2001 | Cleron et al. ................. 709/206 |
| 6,360,254 B1 | * | 3/2002 | Linden et al. ................. 709/219 |
| 6,501,464 B1 | * | 12/2002 | Cobbley et al. ............... 345/173 |
| 6,510,513 B1 | * | 1/2003 | Danieli ......................... 713/156 |
| 6,581,072 B1 | | 6/2003 | Mathur et al. |

(Continued)

FOREIGN PATENT DOCUMENTS

| | | |
|---|---|---|
| GB | 2350711 | 6/2000 |
| WO | WO 02/09346 | 1/2002 |
| WO | WO2006112761 | 10/2006 |
| WO | WO 2007/088337 | 8/2007 |

OTHER PUBLICATIONS

Gunther, Christopher G.; "An Identity-Based Key-Exchange Protocol"; 1998; p. 1-9; Springer-Verlag.

(Continued)

*Primary Examiner* — Mamon Obeid
(74) *Attorney, Agent, or Firm* — Workman Nydegger

(57) ABSTRACT

Sending and receiving encrypted emails. At a web browser, user input is received requesting a compose email page user interface for a web-based email system. The compose email page user interface is requested from a server for the web-based mail system. Web page code is received from the server for the compose email page user interface. The web page code for the compose email page user interface is parsed to determine screen locations of one or more user input interface elements. The compose email page user interface is rendered in the browser. One or more browser-based interface elements implemented integral to the browser are overlaid onto the compose email page user interface. User input is received in the browser user interface elements. The user input received is encrypted. The encrypted user input is transferred into one or more elements of the compose email page user interface.

12 Claims, 7 Drawing Sheets

(56) References Cited

U.S. PATENT DOCUMENTS

| | | | |
|---|---|---|---|
| 6,584,564 B2* | 6/2003 | Olkin et al. | 713/152 |
| 6,886,096 B2 | 4/2005 | Appenzeller | |
| 6,889,379 B1* | 5/2005 | Lindhorst et al. | 719/316 |
| 6,912,656 B1 | 6/2005 | Perlman | |
| 6,934,858 B2 | 8/2005 | Woodhill | |
| 7,143,288 B2* | 11/2006 | Pham et al. | 713/165 |
| 7,203,310 B2* | 4/2007 | England et al. | 380/200 |
| 7,210,036 B2 | 4/2007 | Luzzatto | |
| 7,240,192 B1* | 7/2007 | Paya et al. | 713/152 |
| 7,334,267 B2 | 2/2008 | Engstrom | |
| 7,406,501 B2* | 7/2008 | Szeto et al. | 709/206 |
| 7,434,252 B2 | 10/2008 | Ballinger et al. | |
| 7,478,434 B1 | 1/2009 | Hinton et al. | |
| 7,536,712 B2 | 5/2009 | Kaler et al. | |
| 7,544,504 B2 | 6/2009 | Klemola et al. | |
| 7,564,825 B2 | 7/2009 | Olivereau et al. | |
| 7,614,002 B2 | 11/2009 | Goldfeder et al. | |
| 7,673,135 B2 | 3/2010 | Chin et al. | |
| 7,698,361 B2 | 4/2010 | Mohamed et al. | |
| 7,720,835 B2 | 5/2010 | Ward et al. | |
| 7,730,137 B2 | 6/2010 | Toomey | |
| 7,743,247 B1* | 6/2010 | Horgan et al. | 713/155 |
| 7,764,945 B2 | 7/2010 | Polk et al. | |
| 7,861,082 B2 | 12/2010 | Pinder et al. | |
| 7,886,162 B2* | 2/2011 | Murase et al. | 713/193 |
| 8,045,716 B2* | 10/2011 | Carr | 380/278 |
| 2002/0007453 A1* | 1/2002 | Nemovicher | 713/155 |
| 2002/0188689 A1* | 12/2002 | Michael | 709/206 |
| 2003/0023695 A1 | 1/2003 | Kobata | |
| 2003/0051054 A1* | 3/2003 | Redlich et al. | 709/246 |
| 2003/0140241 A1* | 7/2003 | England et al. | 713/194 |
| 2003/0200435 A1* | 10/2003 | England et al. | 713/172 |
| 2003/0217259 A1* | 11/2003 | Wong et al. | 713/153 |
| 2004/0078752 A1* | 4/2004 | Johnson, Jr. | 715/501.1 |
| 2005/0188030 A1 | 8/2005 | Hudecek | |
| 2006/0036997 A1* | 2/2006 | Low | 717/113 |
| 2006/0259873 A1* | 11/2006 | Mister | 715/781 |
| 2007/0157291 A1* | 7/2007 | Chua | 726/4 |
| 2007/0168436 A1* | 7/2007 | Andam | 709/206 |
| 2007/0174636 A1* | 7/2007 | Raja | 713/189 |
| 2007/0176947 A1* | 8/2007 | Kenyon | 345/629 |
| 2007/0204145 A1* | 8/2007 | Bunn et al. | 713/152 |
| 2007/0288247 A1* | 12/2007 | Mackay | 705/1 |
| 2007/0289002 A1 | 12/2007 | van der Horst | |
| 2008/0065878 A1* | 3/2008 | Hutson et al. | 713/153 |
| 2008/0096593 A1* | 4/2008 | Park | 455/466 |
| 2008/0163090 A1* | 7/2008 | Cortright | 715/771 |
| 2008/0235578 A1* | 9/2008 | Heed et al. | 715/269 |
| 2008/0301468 A1* | 12/2008 | Murase et al. | 713/193 |
| 2009/0034729 A1* | 2/2009 | Brown et al. | 380/270 |
| 2009/0048020 A1* | 2/2009 | Gruen et al. | 463/37 |
| 2009/0106829 A1 | 4/2009 | Thoursie et al. | |
| 2009/0313304 A1* | 12/2009 | Goodger et al. | 707/104.1 |
| 2009/0322587 A1* | 12/2009 | Stayton | 342/37 |
| 2010/0185656 A1* | 7/2010 | Pollard | 707/769 |
| 2010/0186066 A1* | 7/2010 | Pollard | 726/3 |

OTHER PUBLICATIONS

Chen, Liqun; "An Interpretation of Identity-Based Cyptography"; 2007; p. 1-26; Springer-Verlag.

BNET; "Level 8 Systems, Inc., Acquires Assets of Ensuredmail (R), Secures Additional Working Capital"; Jan. 2004; p. 1-5; Market Wire; http://findarticles.com/p/articles/mi_pwwi/is_20050229/ai_mark800806140.

Garfinkel, Simson L., Email-Based Identification and Authentication: An Alternative to PKI?, IEEE Security & Privacy, Nov.-Dec. 2003, vol. 1, Issue 6, pp. 20-26, IEEE Computer Society.

Web Browser, Wikipedia, Retrieved on Sep. 21, 2010 from http://en/wikipedia.org/wiki/Web_Browser.

Notice of Allowance dated Nov. 28, 2011 cited in U.S. Appl. No. 11/760,742.

\* cited by examiner

ENCRYPTED EMAIL BASED UPON TRUSTED OVERLAYS

STATEMENT REGARDING FEDERALLY SPONSORED RESEARCH OR DEVELOPMENT

This invention was made with government support under NSF 0325951 awarded by the National Science Foundation. The government has certain rights in the invention.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system. Connected computing systems have allowed for communication through such means as email communication.

Email is ubiquitous. It is a popular communication medium for both personal and business purposes. Most email messages are insecure, which means they lack several important security properties including confidentiality, integrity and authenticity. Confidentiality implies that only the intended recipient can read the message. Integrity implies that no one can modify, without detection, a message once it is sent. Authenticity implies that the message is from the stated sender and not an impostor. Email messages sent on the Internet today can be compared to postcards sent through ordinary mail. Anyone with access to a message in transit or in storage can read it. Additionally, with modest effort, someone with access can modify or forge an email message.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Some embodiments described herein are directed to methods of sending and receiving secure emails by sending and receiving encrypted emails. Embodiments may be practiced at a web browser in a computing system. User input is received requesting a compose email page user interface for a web-based email system. The compose email page user interface is requested from a server for the web-based mail system. Web page code is received from the server for the compose email page user interface. The web page code for the compose email page user interface is parsed to determine screen locations of one or more user input interface elements including at least an email text box user input interface element. The compose email page user interface is rendered in the browser. One or more browser-based interface elements implemented integral to the browser and separate from the web page code from the server is overlaid onto the compose email page user interface. One or more of the browser-based interface elements are displayed at one or more of the determined screen locations, including overlaying a browser-based text box user input interface element over the email text box user input interface element. User input is received in the browser-based text box user interface element. The user input received in the browser-based text box user interface element is encrypted. The encrypted user input is transferred into one or more elements of the compose email page user interface.

For receiving encrypted email, an example method is practiced at a web browser in a computing system. The method includes receiving user input requesting a read email page user interface for a web-based email system. The read email page user interface is requested from a server for the web-based email system. Web page code is received from the server for the read email page user interface. The web page code for the read email page user interface is parsed to determine screen locations of one or more user interface elements including at least an email text box user output interface element. The read email page user interface is rendered in the browser. One or more browser-based interface elements implemented integral to the browser and separate from the web page code are overlaid onto the read email page user interface. One or more of the browser-based interface elements are displayed at one or more of the determined screen locations, including overlaying a browser-based text box user output interface element over the email text box user output interface element. Encrypted text is received from the web-based email system. The encrypted text from the web-based email system is decrypted and the decrypted text is transferred into one or more elements of the read email page user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein are directed to secure web-based applications, such as secure web-based email applications. For example, one embodiment allows a browser-based plug-in to overlay interface elements over interface elements provided in a web page by a web-based application provider such as an email provider. For example, a browser-based plug-in may have a text box user input interface element that overlays, by being displayed in a location in place of a web page based text box user input interface element implemented in a web page. User text is then entered into the browser-based text box user input interface element such that plain text versions of the user text is only available locally on the machine on which the browser is installed. The browser-based plug-in may include functionality for encrypting the user text and then transferring the encrypted text to the web page based text box user interface element, where the encrypted text is then available to the application provider, such as the email service provider.

Figure 1:
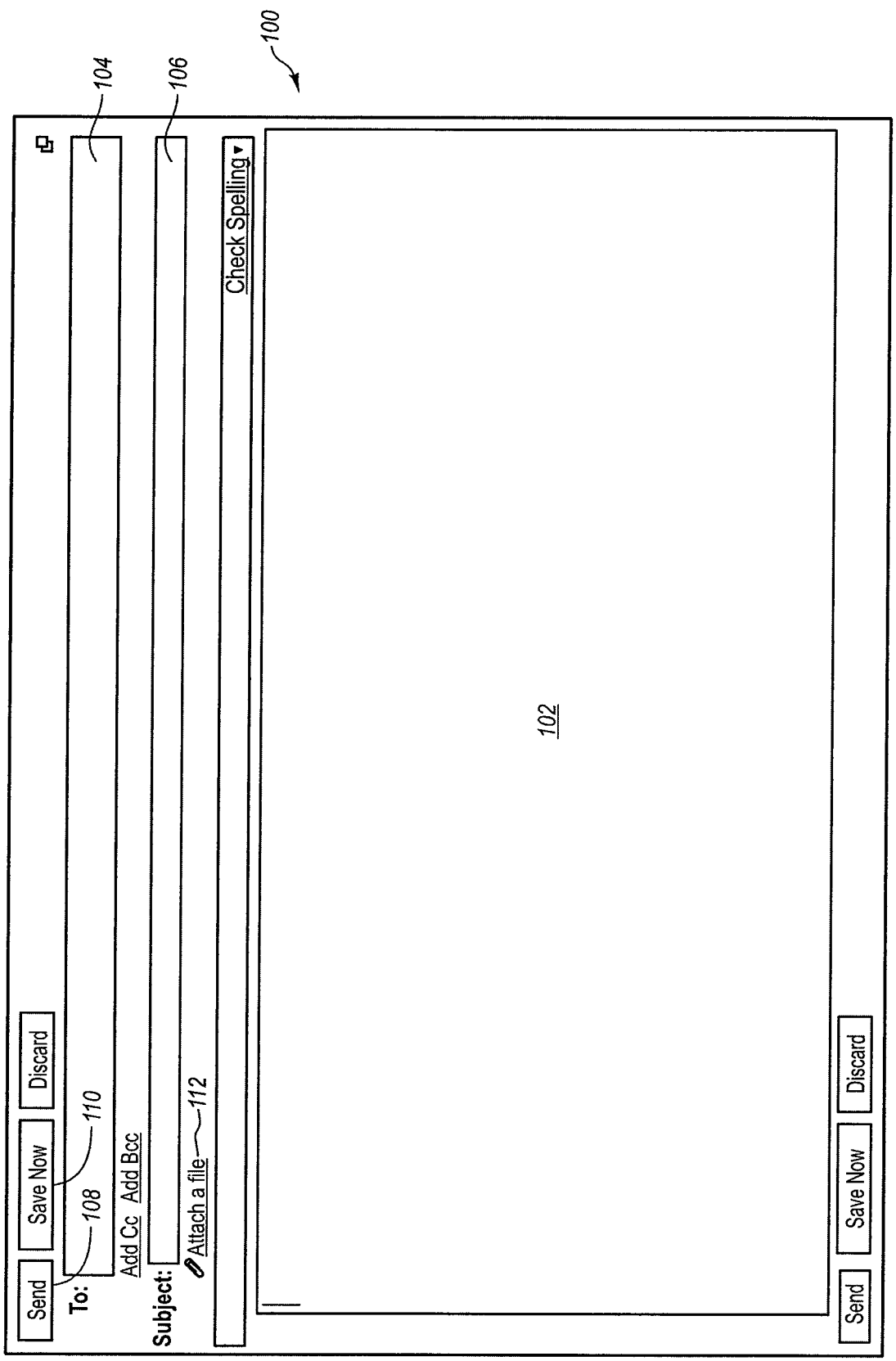
FIG. 1 illustrates a web-based compose email user interface.

An example is now illustrated with reference to FIG. 1. FIG. 1 illustrates a standard web-based compose email page user interface 100. The interface 100 is typically able to be displayed when web page code defining the interface 100 is received from a web page server, such as a server designed to provide web-based email functionality, and rendered in a browser at a client computer.

Figure 3:
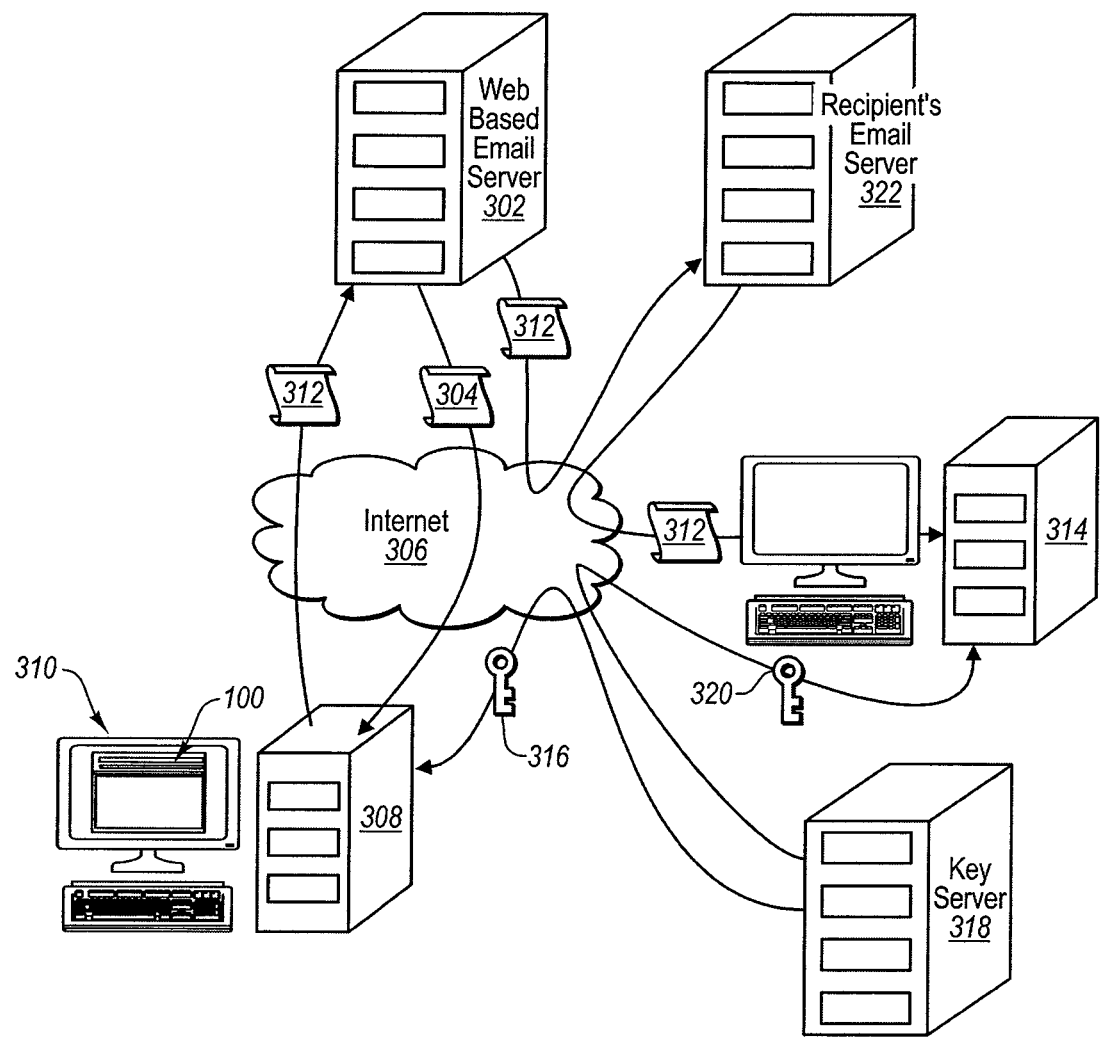
FIG. 3 illustrates a topology of computing devices for accomplishing encrypted email communication functionality.

For example, attention is directed to FIG. 3, which illustrates a server computer 302. The server computer 302 includes functionality for serving web pages. This is accomplished by sending web page code 304 such as HTML code through the Internet 306 to a client computer 308 (sometimes referred to herein as a simply a client, a sender client, or a sender). The client 308 includes software modules that implement applications that can receive the web page code 304 and render the web page code on a display 310. In particular, the client 308 may include software modules with code that when executed by one or more processors at the client 308 implements a browser that is capable of rendering the web page code 304.

Returning once again to FIG. 1, the web-based compose email page user interface 100 has a number of interface elements. For example, the web-based compose email page user interface 100 includes a text box user input interface element 102. This element 102 allows for text, such as plain text for an email to be entered into the element 102. The web-based compose email user interface 100 further includes a to user input interface element 104 and a subject line user input interface element 106. A user can input email addresses to recipients of emails in the to user input interface element 104. A user can input a subject entry in the subject line user input interface element 106 indicating a short summary of the text in the text box user input interface element 102. Additionally, a user can attach files to an email. For example, by selecting the interface element 112, additional interface elements may be activated which allow a user to browse local storage for files, which can then be uploaded to an email provider and attached to an email message and sent with an email message. By selecting a send button user interface element, 108, an indication can be made to an email server that the email message should be sent to the recipients specified in the to user input interface element 104.

Returning once again to FIG. 3, the server computer 302 may further include functionality for providing web-based email services. Illustratively, the web page code 304 may be code for a compose email page user interface such as the interface 100 illustrated in FIG. 1. Using the interface 100, a user may provide information identifying a recipient of an email, as well as email text and/or attachments. The user can then send this provided information, illustrated at 312, back to the server 302 through the Internet 306, where it can then be sent to a recipient, such as recipient 314 illustrated in FIG. 3, through the Internet 306 such as for example by sending through an email server 322 for the recipient 314. Notably, in some examples, the sender's email server 302 and recipient's email server 322 may be the same server, such as when both sender and recipient share the same email provider. In this case, the email may not be sent through the internet 306 from sender server 302 to recipient server 322.

Embodiments may be implemented where at least a portion of the information 312 is encrypted. This prevents the encrypted portion of the information 312 from being read while in transit to the server 302 and subsequently to the client 314. Additionally, this prevents access to the encrypted portions of the information by users with access to the server 302 when the information 312 is stored on the servers 302 and 322, or other servers.

Encryption may be accomplished by use of an encryption key 316 obtained through the internet 306 from a key server 318. The actual encryption key used to encrypt an email message may actually be a purpose specific key derived from the key 316 obtained from the key server 318. Similarly, decryption may be accomplished at the recipient 314 by using a decryption key 320 obtained from the key server 318. In one embodiment, encryption may be accomplished using Advanced Encryption Standard (AES) and Cryptographic Message Syntax (CMS).

To accomplish the encryption, a browser-based solution that is integral to the browser (e.g., is included in the code for a browser application, such as either by implementing a plug-in or in native browser application code) used by a user may be used to overlay web page based interfaces to prevent a provider of the web page from having plain text access to information that is intended to be encrypted. In particular, the web page code 304 provided by the server 302 may include functionality for: periodically; when the send button user interface element is selected; when a save now button user interface element 110 is selected; or by other means, sending information entered by the user in the interface 100 back to the server 302. This may cause plain text versions of the information 312 to be sent through the network (e.g., the Internet 306) where it can be viewed and/or plain text versions to the server 302, where someone with access to the server 302 can view the email. Thus, some embodiment described herein implement the browser-based solution where plain text is entered by the user in a browser-based interface not available to the server 302, whereafter browser-based code encrypts the plain text and transfers is to the web page based interface 100 where it can then be sent to the server 302 over the network in encrypted form.

Figure 2:
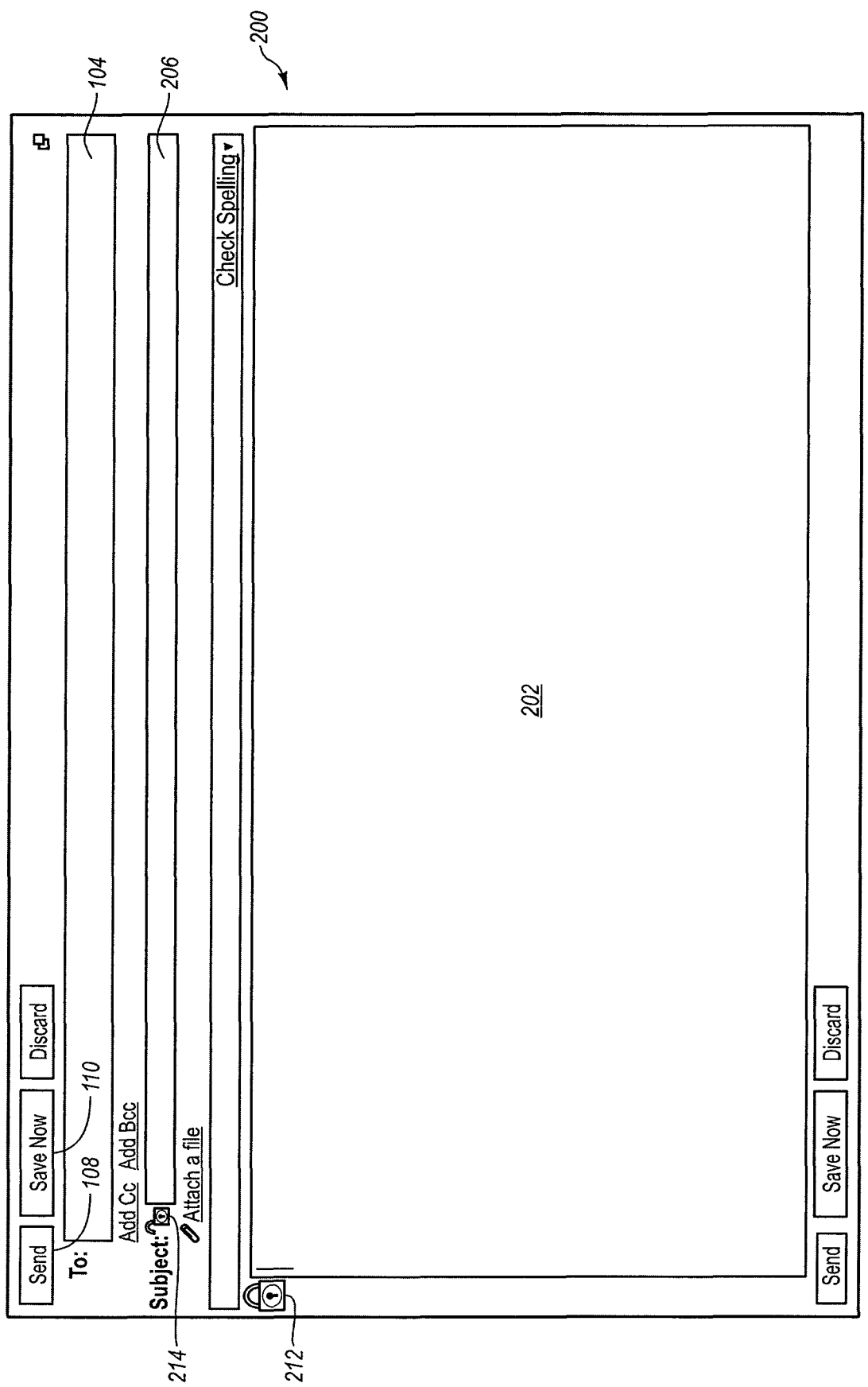
FIG. 2 illustrates a web-based compose email user interface with overlaid secure user interface elements.

Referring now to FIG. 2, an example embodiment illustrating overlays is shown. In the example shown in FIG. 2, a browser-based interface 200 overlays the web page based interface 100. However, only certain portions of the browser-based interface 200 overlay corresponding portions of the web page based interface 100. For example, FIG. 2 illustrates that a browser-based text box user input interface element 202 overlays the web page based text box user input interface element 102. Similarly, a browser-based subject line user input interface element 206 overlays the web page based subject line user input interface element 106. However, other elements of the web page based interface 100 are not overlaid, such as for example, the to line user input interface element 104.

In some embodiments, not all portions of the user input should be encrypted. For example, if the recipient information entered into a to line user input interface element is encrypted, the email may not be able to be delivered if the email server is not able to decrypt the information.

Additionally, embodiments may include functionality for allowing a user to select whether or not encryption is used for certain portions of an email message. For example, FIG. 2 illustrates encryption selection icons 212 and 214 for text box user input interface elements and subject line user input interface elements respectively. In the example illustrated, the default is for the text box input to be encrypted and the subject line input to not be encrypted. However, other defaults and/or selections can be made depending on the particular circumstances.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 4:
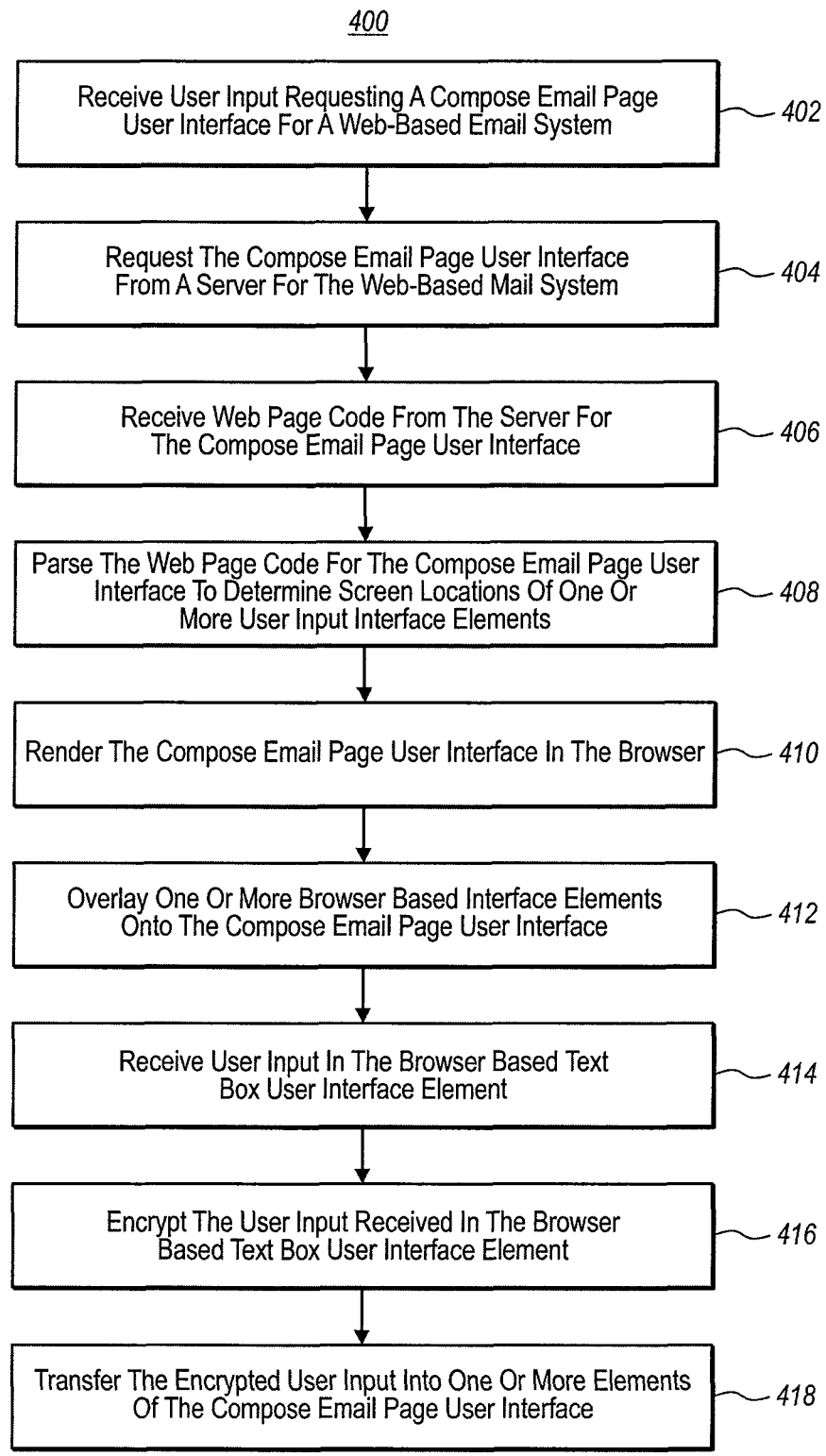
FIG. 4 illustrates a method of sending an encrypted email.

Referring now to FIG. 4, a method 400 is illustrated. The method 400 may be practiced in a computing system that implements a web browser. The method 400 includes acts for sending a secure email. The method includes receiving user input requesting a compose email page user interface for a web-based email system (act 402). For example, a user at the client computer 308 illustrated in FIG. 3 may request a compose email page user interface, such as the compose email page interface 100 illustrated in FIG. 1.

The method 400 may further include requesting the compose email page user interface from a server for the web-based mail system (act 404). For example, the client 308 illustrated in FIG. 3 may send an http request to the server 302 for web page code used to render a compose email page user interface, such as the compose email page interface 100 illustrated in FIG. 1.

The method 400 may further include receiving web page code from the server for the compose email page user interface (act 406). An example is illustrated in FIG. 3, where the web page code 304 is received by the client 308 from the server 302.

The method 400 may further include parsing the web page code for the compose email page user interface to determine screen locations of one or more user input interface elements (act 408). This may include parsing the web page code for the compose email page user interface to determine screen locations of at least an email text box user input interface element. For example, the web page code 304 may include code that can be used to render the interface 100 illustrated in FIG. 1. This code may be, for example, HTML (hyper text mark-up language) code that defines a page layout for the interface 100. By parsing this code, a determination can be made where certain elements of the interface 100 will be rendered. In particular, a determination can be made where the text box user interface element 102 will be rendered.

The method 400 may further include rendering the compose email page user interface in the browser (act 410). For example, the interface 100 may be rendered on the display 310 of the client 308. Rendering the interface does not necessarily include graphically rendering the entire interface. For example, portions of the interface that will be later overlaid may not be graphically rendered on the display. However, as will be explained in more detail below, even though interface elements are not graphically rendered, input can nonetheless be transferred into those elements. For example, from the server's 302 perspective, input entered by a browser plug-in at the client 308 into an interface element (e.g., element 102) will appear the same as if the input had been entered by a user interacting with the element.

The method 400 may further include overlaying one or more browser-based interface elements onto the compose email page user interface (act 412). Embodiments may be implemented where the one or more browser-based interface elements are implemented integral to the browser and separate from the web page code received from the server. For example, a browser implemented using code modules installed at the client 308 may include functionality for rendering browser-based interface elements. These browser-based interface elements are not part of the web page code 304 received from the server 302, although the web page code 304 may be combined with other web page code to facilitate rendering the browser-based interface elements. In particular, in some embodiments, the browser-based interface elements are generated on the same computer where they are displayed rather than on a remote server. One or more of the browser-based interface elements are displayed at one or more of the determined screen locations. For example, a browser-based text box user input interface element (e.g., element 202) may be overlaid over the email text box user input interface element (e.g., element 102).

The method 400 may further include receiving user input in the browser-based text box user interface element (act 414). For example, a user at the client 308 may input text into the text box user input interface element 202.

The method 400 may further include encrypting the user input received in the browser-based text box user interface element (act 416). For example, the user input entered into the browser-based text box user input interface element 202 may be encrypted. As will be discussed in more detail below, this may be accomplished by using an encryption algorithm and one or more encryption keys.

The method 400 may further include transferring the encrypted user input into one or more elements of the compose email page user interface (act 418). For example, the encrypted input may be transferred to the web-based email text box user input user interface element 102. Note that while this element 102 may not be graphically rendered, it may still be available for interaction with various computer modules implemented at the client 308. In one example, the browser may include code modules capable of interacting the non-graphically rendered elements. Additionally, it should be noted that the encrypted user input may not necessarily be transferred to a corresponding user input element. For example, in one embodiment, even though user input may be received at a text box user input interface element 202, rather than transferring the encrypted user input to the text box user input interface element 102, the encrypted user input may be transferred to an attachment user interface element, such that the encrypted user input is sent as an attachment to an email rather than in the body of the email.

Thus, while some embodiments of the method 400 may be practiced where transferring the encrypted user input into one or more elements of the compose email page user interface comprises transferring the encrypted user input into the email text box user input interface element overlaid by the browser-based text box user input interface element, other embodiments may be practiced where transferring the encrypted user input into one or more elements of the compose email page user interface comprises transferring the encrypted user input into an email attachment user input interface element of the compose email page user interface.

The method 400 may further include modifying input into other user interface elements to indicate that a secure email is being sent. For example, input may be added to at least one of a subject line user interface element of the compose email page user interface, a to field user interface element of the compose email page user interface, a from field user interface element of the compose email page user interface; a cc field user interface element of the compose email page user interface or the email text box user input interface element of the compose email page user interface to indicate that a secure email is being sent. Such input may include an identifier number, a code, text or other input that could be used to provide an appropriate indicator. Additionally, the indication that a secure email is being sent may be an indication that is readable by a computing system to as to facilitate the computing system's decryption of the secure email, and/or a human readable indication such that a recipient can choose whether or not to decrypt a secure email.

The method 400 may be practiced where encrypting the user input received in the browser-based text box user interface element comprises encrypting the user input using a key derived from a master secret from a key server where the key is further derived from an identifier identifying a sender of the email message and from an identifier identifying the receiver of the email message.

Figure 5:
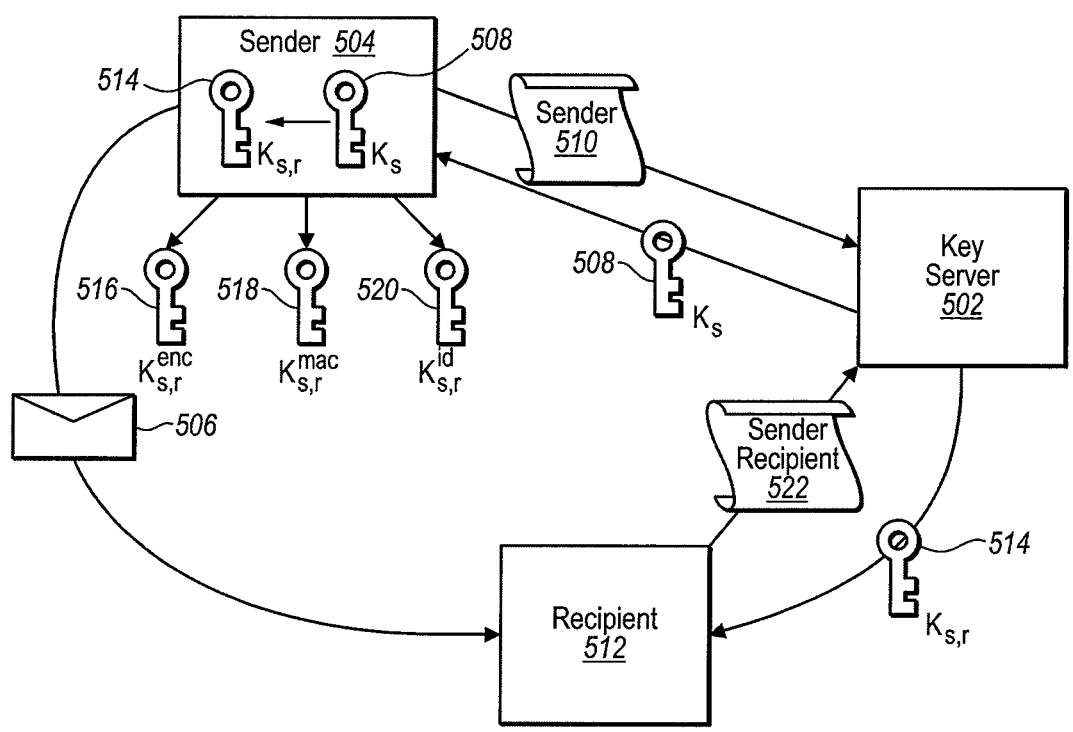
FIG. 5 illustrates a topology of computing devices for obtaining encryption and decryption keys and sending and receiving encrypted emails.

Referring now to FIG. 5, an example of generating and transferring keys, such as keys 316 and 320 is illustrated. FIG. 5 illustrates a key server 502. The key server 502 may sometime be referred to herein as a Key Distribution Center or KDC. In particular, KDC is used as short hand in nomenclature herein to denote the key server. The key server 502 includes a master secret and various algorithms that can use the master secret to create cryptographic keys. The master secret may be, for example, a random number, pseudo random number, or some other numeric or other pattern. In some embodiments, the master secret may be a one-time use nonce used for a specific email transaction.

A sender 504 of an email 506 may desire to obtain a sender key 508 that can be used to encrypt the email 506. The sender key may be represented herein by $k_s$. The sender 504 is authenticated to the key server 502 so that the key server trusts the sender 504. Various authentication techniques will be discussed in more detail below. The sender 504 sends information 510 to the key server 502 to obtain the sender key 508. In one embodiment, the information 510 includes information identifying the sender 504. Such information may be represented by $id_s$ For example, the information may include an email address for the sender 504. The key server 502 uses the master secret and the information identifying the sender 504 to generate the sender key 508, which is then sent to the sender 504. The sender 504 may indirectly use the sender key 508 to encrypt the email 506 before sending the email 506 to a recipient 512. In particular, while the sender key 508 is not directly used to encrypt the email 506, the sender key 508 may be used to derive other keys that can be used for encrypting the email 506.

Thus, in some embodiments, encryption using the sender key 508 involves the further creation of one or more additional keys. For example, the sender 504 may include additional code that allows the sender 504 to generate a sender-recipient key 514, sometimes noted herein as $k_{s,r}$. The sender-recipient key 514 is a key that is generated using the sender key 508 and information identifying the intended recipient of the email 506, sometimes denoted herein as $id_r$, such as an email address. In some embodiments, encryption may further include the generation of still further specific purpose keys. For example, in the example illustrated in FIG. 5, an encryption key 516 (sometimes denoted herein as $k_{s,r}^{enc}$) is generated, a method authentication code (mac) key 518 (sometimes denoted herein as $k_{s,r}^{mac}$) is generated, and a key identifier key 520 (sometimes denoted herein as $k_{s,r}^{id}$) is generated.

As it is good cryptographic practice to have purpose-specific keys, the sender-recipient key $k_{s,r}$ and a nonce η are used in a key derivation function (KDF) to derive three different keys:

$k_{s,r}^{enc} = KDF_{k_{s,r}}(\text{"enc"} \| \eta)$
$k_{s,r}^{mac} = KDF_{k_{s,r}}(\text{"mac"} \| \eta)$
$k_{s,r}^{id} = KDF_{k_{s,r}}(\text{"id"} \| \eta)$ The key $k_{s,r}^{enc}$ is used to encrypt the message body and attachments while $k_{s,r}^{mac}$ is used to provide integrity to both the ciphertext and the plaintext. The nonce η provides randomness so identical messages encrypted with the same key will appear different.

The encrypted message keys for each recipient are identified by a key identifier. To prevent leaking the identity of blind carbon copy (BCC) recipients, in some embodiments, this key identifier is replaced with a keyed fingerprint, computed as follows:

$$MAC_{k_{s,r_x}^{id}}(id_{r_x}).$$

A recipient can easily compute their keyed fingerprint, yet will be unable to determine the identities of the other recipients of the message.

To promote standardization and interoperability, in some embodiments, the Cryptographic Message Syntax (CMS) is used to format the encrypted message. Once packaged, the encrypted message can be set as an attachment to a regular email message. The body of this message may contain decryption instructions for recipients that are unfamiliar with encrypted email. A more detailed outline of message packaging steps can be found below.

The email recipient 512 may also obtain decryption keys from the key server 502. In this example, the decryption key obtained is the same sender-recipient encryption key 514 created by the sender 504, except this time the sender-recipient encryption key 514 is created by the key server 502. Illustratively the recipient 512 is authenticated to the key server 502. The recipient 512 sends information 522 to the key server 502. The information 522 includes information identifying the sender 504 and the recipient 512. Such information may be, for example, the sender's email address and the recipient's email address. The key server 502 uses this information, along with the master secret to generate the sender-recipient key 514, which is then sent to the recipient 512. The recipient 512 can use the sender-recipient key 514 to decrypt the email message 506. Notably, the recipient 512 is not sent the sender key 508 so as to prevent the recipient 512 from impersonating the sender 504. Additionally, some embodiments may be implemented where the key server 502 discards the sender key 508 and the sender-recipient key 514 after the sender-recipient key 514 is sent to the recipient 512.

In light of the context provided by the description of FIG. 5, the method 400 may be practiced where wherein encrypting the user input received in the browser-based text box user interface element includes sending a request to a key server for a sender key. The request includes an identification of an entity sending the secure email. Such an identification may be, for example, an email address of a sender of the secure email. As noted, this may be performed by a sender that has been authenticated to the key server. Encrypting may further include receiving a sender key. The sender key is derived from a master secret key and the identification of the entity sending the secure email. Encrypting may further include generating a sender-recipient key using the sender key and an identification of a recipient of the secure email and using the sender-recipient key, encrypting the user input received in the browser-based text box user interface.

As noted, this may further include using the sender-recipient key to generate a plurality of purpose specific keys, including an encryption key, a method authentication code key, and a key identifier key. Using the sender-recipient key, encrypting the user input received in the browser-based text box user interface element includes using the encryption key to encrypt the user input received in the browser-based text box user interface element and using the method authentication code key to provide integrity to both encrypted text and plaintext in the email.

The method 400 may be practiced where the browser-based interface is implemented integral to the browser through the use of a browser plug-in. In an alternative embodiment, the browser-based interface may be implemented using native browser functionality if a browser has been so designed.

The method 400 may be practiced where transferring the encrypted user input into one or more elements of the compose email page user interface occurs periodically as user input is received in the browser-based text box user interface element to allow auto saving of an encrypted draft at a web-based mail system server. For example, many web-based email systems include functionality for scraping input at web page based interface elements, uploading the input to a server, and auto saving the input at the server. For example, and referring to FIGS. 1, 2 and 3, input into the interface element 102 may be periodically uploaded to the server 302 where it is stored at the server 302 as an auto-saved draft. Note that periodically as used herein does not necessarily require the action to occur at some pre-specified period, but may also include non uniform time intervals. Thus, to allow for auto-saving, embodiments may allow for data input into a browser-based user interface element (e.g., interface element 202) to be encrypted and transferred to a web page based user interface element (e.g., interface element 102) on a periodic basis such that an encrypted version of an email draft may be saved at the server The method 400 may further include periodically, locally caching a plain text copy of the user input received in the browser-based text box user interface element. For example, embodiments may include functionality for locally caching at the computer system implementing the browser, the user input received at the interface 202. However, other embodiments may disallow such caching when the computer system on which the browser is installed is a publicly accessible system for use by multiple users.

The method 400 may be practiced where overlaying one or more browser-based interface elements onto the compose email page user interface includes overlaying other elements as well. For example, embodiments may include overlaying one or more of a subject line user interface element of the compose email page user interface or an attachments interface element of the compose email page user interface. A subject line overlay element 206 is illustrated in FIG. 2. Thus, in some embodiments, even the subject line can be encrypted. However, it may be preferable to not encrypt the subject line if a recipient does not already have decryption software installed, as the recipient may be less motivated to obtain decryption software. Leaving the subject line as plaintext can potentially leak information about the content of the message. Some users may think any and all text, including the subject, is encrypted and thus they can enter any text they desire. It is not unusual for account numbers, invoice numbers, etc., to be found in the subject line of an email. Some email messages include only a subject line with no text in the body.

Nevertheless, in some embodiments, there is value to leaving the subject line as plaintext. A plaintext subject line helps motivate a recipient to actually decrypt a message. Messages can be sent to recipients with whom the sender has never had contact. An email may include decryption instructions for recipients who do not already have decryption software installed, as will be discussed in more detail below. While the decryption instructions will help the recipient figure out how to decrypt the message, it may not provide much in the way of motivation to actually follow the steps inasmuch as they may be only generic instructions. With the pervasiveness of spam, many users unfamiliar with encrypted email in general may regard encrypted messages as junk.

A plaintext subject line may provide the motivation needed to motivate a recipient to obtain software to decrypt the email message. For example, if a sender encrypts a message but in the subject line, using unencrypted plain text states "New family photos," a recipient may be more likely to take the time to decrypt the message.

The method 400 may be practiced where overlaying one or more browser-based interface elements onto the compose email page user interface includes overlaying one or more of a to field user interface of the compose email page user interface, a cc field user interface of the compose email page user interface, or a bcc field user interface of the compose email page user interface. This may be done, for example when the secure email will be sent using a relay server. The relay server can decrypt the information applicable to these fields such that the email can be later appropriately routed.

The method 400 may be practiced where overlaying a browser-based interface is performed in response to user input indicating a desire to send a secure email. Alternatively, the method 400 may be practiced where overlaying a browser-based interface is performed as a default behavior. In some versions of this embodiment, user input may be received at the browser indicating that the user does not desire to send a secure email. If a user so indicates, the browser-based interface can be removed. Alternatively, the browser-based interface may simply pass user input to web page based interfaces without encrypting.

Figure 6:
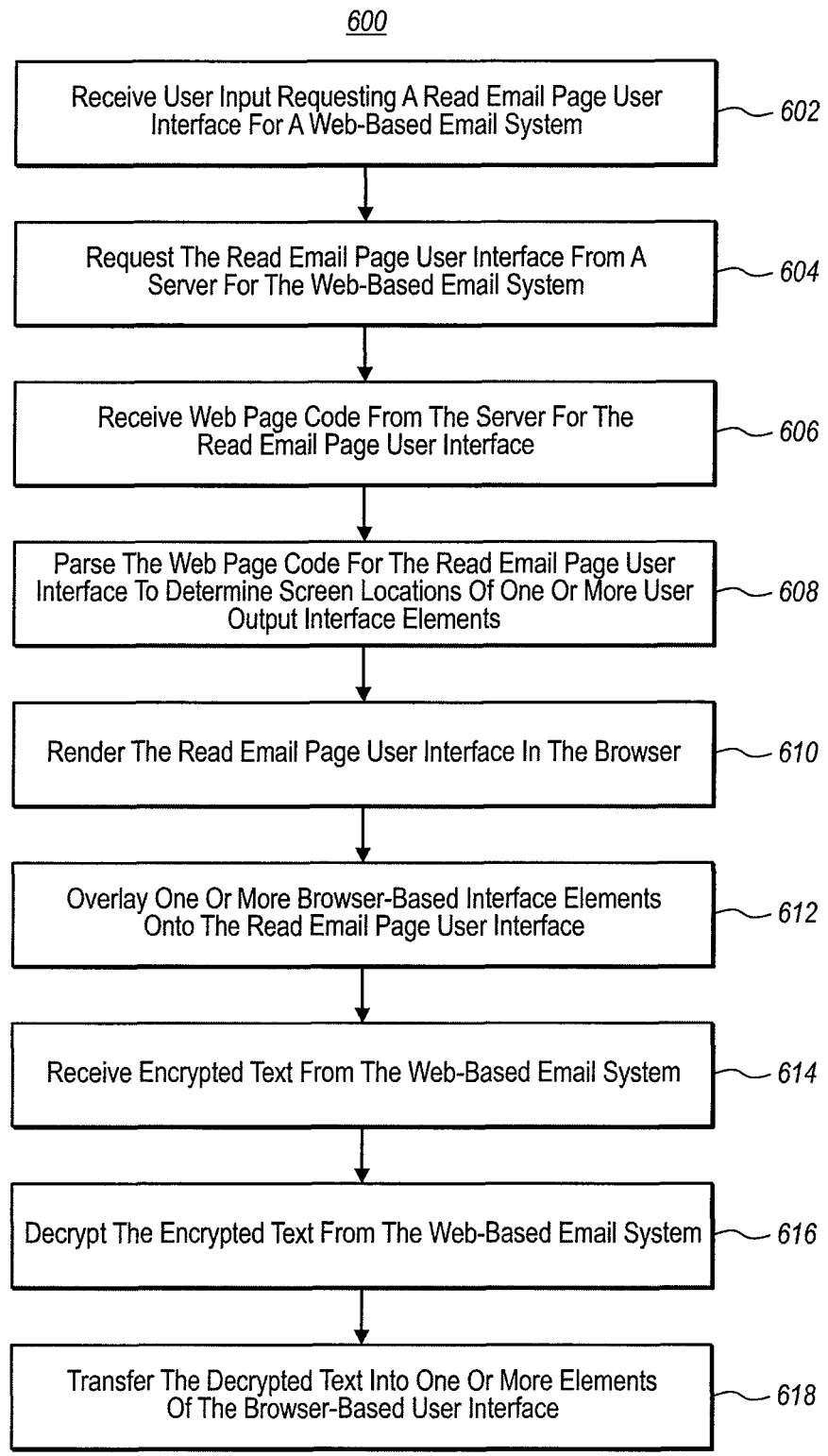
FIG. 6 illustrates a method of receiving an encrypted email.

Referring now to FIG. 6, another method 600 illustrated from the perspective of an email recipient computing system, such as recipient 314 is illustrated. The method 600 may be practiced at a web browser in a computing system. The method includes acts for receiving a secure email. The method includes receiving user input requesting a read email page user interface for a web-based email system (act 602). For example, an interface such as the interface 100 may be requested by a user at the recipient computer system 314, except that the interface may be one used in a web-based email system for reading email messages that have been sent to a recipient.

The method 600 further includes requesting the read email page user interface from a server for the web-based email system (act 604). For example, the recipient 314 illustrated in FIG. 3 may request web page code from the server 302 for a read email page user interface.

The method 600 further includes receiving web page code from the server for the read email page user interface (act 606). For example, the server may send web page code (similar to the web page code 304) to the recipient 314, where the web page code defines the read email page user interface.

The method 600 further includes parsing the web page code for the read email page user interface to determine screen locations of one or more user interface elements (act 608). In one embodiment, the one or more user interface elements includes at least an email text box user output interface element. For example, the web page code may be parsed to find a text box that outputs email text to a user.

The method 600 further includes rendering the read email page user interface in the browser (act 610). For example, the read email page user interface defined in the web page code may be rendered at the display of the recipient 314. As with the sending email example above, rendering does not necessarily require that all portions of the read email page user interface be graphically rendered on a screen. In particular, when portions of the interface are overlaid (as will be described below) those portions, in some embodiments are not graphically rendered. Although, those portions may be nonetheless available for interaction with the browser code or other code on a host computing system such the recipient computing system 314.

The method 600 further includes overlaying one or more browser-based interface elements onto the read email page user interface (act 612). In one embodiment, the one or more browser-based interface elements are implemented integral to the browser and separate from the web page code. Additionally, one or more of the browser-based interface elements may be displayed at one or more of the determined screen locations. This may include overlaying a browser-based text box user output interface element over the email text box user output interface element (act 612).

The method 600 further includes receiving encrypted text from the web-based email system (act 614). The encrypted text from the web-based email system is decrypted (act 616). The decrypted text is transferred into one or more elements of the browser-based user interface (act 618).

The method 600 may be practiced where decrypting the encrypted text from the web-based email system includes decrypting using a key derived from a master secret from a key server, the key further being derived from an identifier identifying a sender of the email message and from an identifier identifying the receiver of the email message. For example, and as previously illustrated, a key such as the sender-recipient key 514 may be used by a recipient 512 to decrypt and email 506. As noted, in some embodiments, the recipient 512 may receive the sender-recipient key 514 (or a key derived therefrom) from the key server 502 rather than deriving the key itself. Thus, the method 600 may be practiced where decrypting the encrypted text from the web-based email system includes requesting a key from a key server. The request from the key server includes an identification of a sender of the email message (such as for example an email address, a username, or other identifier) and an identification of the recipient of the email message (such as an email address, a username, or other identifier). Decrypting may further include receiving a sender-recipient key from the key server, where the sender-recipient key is derived from a master secret, the identification of a sender of the email message and the identification of the recipient of the email message.

Figure 7:
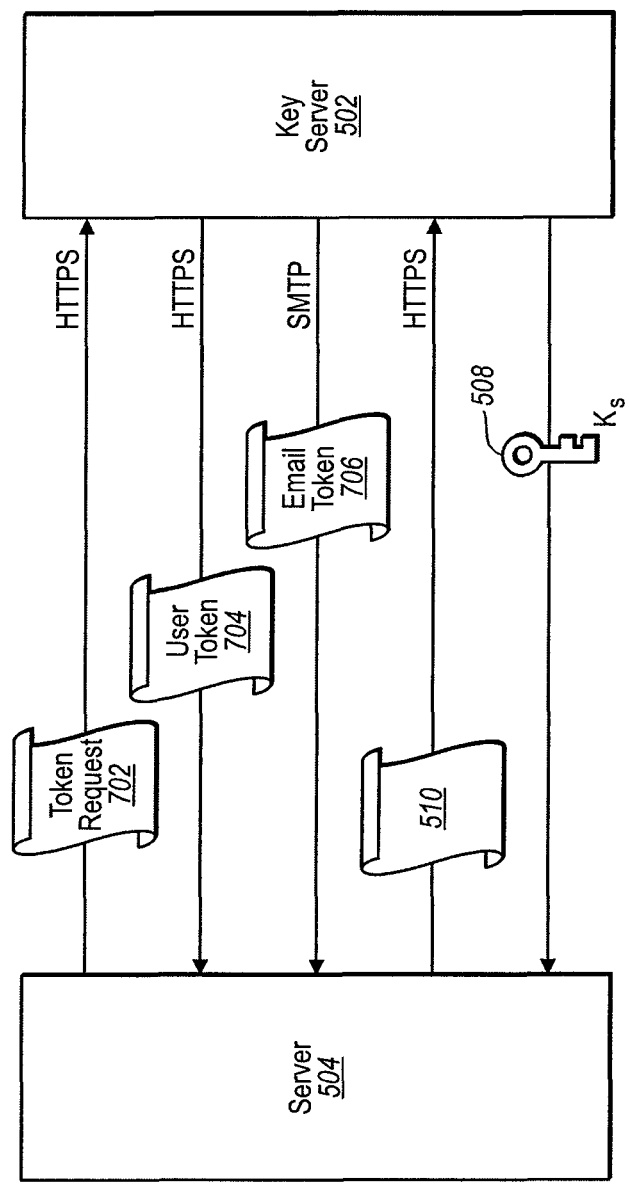
FIG. 7 illustrates a topology for authenticating senders and receivers to a key server.

As noted previously, for senders and recipients to obtain keys from the key server, some embodiments require the senders and recipients to be authenticated to the key server. Referring now to FIG. 7, various authentication actions are illustrated. FIG. 7 illustrates what is sometimes referred to herein as Simple Authentication for the Web (SAW). In the example illustrated, a sender, such as sender 504 may send a request 702 to the key server 502 for a token, where the token can be used to obtain a sender key 508 from the key server 502. In one embodiment, the token request 702 is sent using HTTPS to protect the contents of the token request 702. Sending the token request 702, in some embodiments may be performed automatically when it is clear that a user intends or desires to send an encrypted email.

In response to receiving the token request 702, the key server 502 sends a user token 704 to the sender 504. The user token 704, may be for example, a cookie that can be stored at a storage device at the sender 504. In the example illustrated, the user token 704 is sent to the sender 504 using HTTPS to protect the contents of the user token 704. Additionally, the key server 502 sends via email (in this example, over SMTP) an email token 706. The user token 704 and email token 706 can be algorithmically combined to act as the token used when requesting the sender key 508.

FIG. 7 illustrates that the sender 504 sends a key request, such as for example information 510 to the key server 502 to obtain the sender key 508. In one embodiment, the information 510 may include the token generated from the user token 704 and the email token 706.

A similar process for recipients, such as recipient 512 may be followed to obtain the sender-recipient key 514.

FIG. 7 illustrates one form of authentication that could be used. Other authentications may be used alternatively or additionally to the authentication described above. For example, standard challenge response authentication may be used, username password authentication may be used, smart cards or other physical tokens may be used, etc.

Additional features may also be implemented in the embodiments described above. For example, some embodiments may include additional features for policy-based encryption. For example, a sender 504 can specify certain policies associated with encryption keys to the key server 502. This enables senders to specify fine grained access control based on arbitrary policies. This approach provides policy-based encryption and may be dependent on the key server 502 to enforce these constraints, though a similar trust is already placed in the key server to ensure that it only assists intended recipients to decrypt messages. Example policies include policies limiting the length of time a key is valid, "Do not open before" and/or "Do not open after" policies. With minimal overhead to the key server 502, self-destructing encrypted messages can be created. In particular, a key server may have a list of ephemeral (short lived or transitory) values that it deletes after a specific set of conditions (e.g., one value for each hour of the day, after that hour passes that value is deleted, and a new one created for use on the next hour). This enables a sender to encrypt a message that says decrypt before 4 pm PST or you never will be able to. Once the key server deletes its ephemeral value it cannot decrypt it, even if it wanted to.

Embodiments may also be implemented to reduce the number of authentications that take place for senders 504 and/or recipients 512 to authenticate to the key server 502. As some authentication techniques involve a potentially high latency, such as the SAW technique described above, the key server 502 can extend the valid lifetime of a successful authentication by giving the user (e.g., the sender 504 or recipient 512) a resumption key that is constructed as follows:

$$k_s^{saw} = KDF_{k_{KDC}^{saw}}(id_s \| \varepsilon)$$

where $id_s$ is the senders 504 email address and $\varepsilon$ is the expiration date of the resumption key. Note that in some embodiments a purpose-specific key $k_{KDC}^{saw} = KDF_{k_{KDC}}("saw")$ is derived from $k_{KDC}$, the master secret at the key server 502, is to ensure that the resumption keys cannot be used for regular encryption of email message. Because the resumption key is dynamically generated, the key server 502 does not have to store user-specific information to facilitate this process. In other embodiments, the purpose specific $k_{KDC}^{saw}$ is randomly generated to ensure that $k_{KDC}$ cannot be used to generate a resumption key.

To authenticate to the key server 502 using the resumption key $k_s^{saw}$, a provably secure mutual authentication protocol (e.g., MAP1) could be used. Note that the value should be given to the key server 502 so it can re-compute its value for $k_s^{saw}$ and verify that this key has not expired.

Embodiments may use sender authentication to reduce spam. A common practice among spammers is to forge the sender's address in an email message to make it appear as if the message appear to come from a source known to, or trusted by, the recipient. Because some embodiments require a sender to prove ownership of her email address through authentication before a sender key can be obtained, spammers will only be able to send messages from accounts they actually control. If a spammer attempts to forge the sender address the message decryption and integrity checks will fail. By authenticating the origin of an email, some embodiments also increase the effectiveness of blacklists, which are a useful tool to reduce spam. In addition to empowering users to validate a sender's email address, embodiments can also enable email providers to verify an email message's origin without disclosing its encrypted contents. This is accomplished by adding the ability for the email provider to verify the integrity of the message's ciphertext (i.e., add $$MAC_{k_s,r_x}(C),$$

where $r_x$ is the email providers identity).

Some embodiments may be implemented which hide the presence of BCC recipients. Replacing key identifiers with keyed fingerprints solves the problem of leaking the identity of BCC recipients, but does not hide the presence of the BCC recipients altogether. To hide the presence of BCC recipients, $(R_{max} - R_{act})$ fake recipients may be added (where $R_{max}$ is the maximum number of recipients a message can have and $R_{act}$ is the number of actual recipients, along with fake keys. Thus if $R_{max}$ is 20 and $R_{act}$ is 11, the message will have 9 fake sender-recipient keys that will not be distinguishable from the legitimate keys. $R_{max}$ is greater than the number of recipients any message is likely to have. If $R_{max}$ is less than $R_{act}$ the presence of BCC recipients will be leaked, although their identities are still private because they have been replaced with keyed fingerprints. The value of $R_{max}$ can be customized to the specific instance, and is specified by the sender. The value of $R_{max}$ is decided upon before any message decryption messages are sent. If the value of $R_{max}$ is suddenly increased for a particular message, a recipient may suspect the presence of BCC recipients. Because adding fake recipients represents additional overhead in terms of message size, care should be taken in its selection.

While the embodiments described above have illustrated browser-based overlays for web page code based interfaces, it should be appreciated that other interfaces could be used as well. For example, a sender may use an email specific program with encryption functionality to send encrypted messages, while a recipient continues to use a browser-based overlay to receive the messages sent using the email specific program. Similarly, a sender may use browser-based overlays, while the recipient uses an email specific program with decryption functionality. As can be imagined, other permutations of interfaces can be implemented as well.

In particular, embodiments may allow for a number of different interfaces. The following discussion includes a discussion of on-line clients, extended local email clients, and the already discussed overlaid webmail interfaces.

A zero-footprint online client (e.g., Java Applet) may be implemented for users who are either traveling or do not have an application (e.g., browser or stand-alone email client) for which an extension has been developed. To access the online client, users first authenticate using authentication techniques. For example, the authentication techniques described previously herein may be used to authenticate a user. Other authentication techniques may be used alternatively or additionally to those described previously. In one embodiment, the online client includes two tabs for selecting different interface views, one for authoring secure messages and one for reading secure messages. Once a user has authored a secure message they are presented with a dialog from which they can copy and paste into their email client or web-mail interface and download a file that contains the entire encrypted message. Users simply attach this file to their message and it can be readily decrypted by any of the other clients. Decryption details such as the sender's address and key time may be included as headers within this file.

Some embodiments may be used by extending existing local email client applications. Existing email client programs (e.g., Outlook, Thunderbird, Mail.app) that run on a user's local machine can be extended to provide tightly coupled support for encrypted email. For example, messages can be automatically and transparently decrypted as they arrive. Decrypted email messages would then be stored at the user's local computer, but remain encrypted on the email server. Authoring a secure message using one of these local clients remains the same, except that in some embodiments the message composition window may be modified to enable the user to toggle whether or not a message will be sent using encryption. In some embodiments, a colored border can also be used to help users easily identify the security status of the message. Note that colored borders may be used in other interfaces, such as the browser-based interface or the zero-footprint interface as well Additionally, whether or not a message defaults to secure or insecure may be a user-defined preference.

As previously discussed herein, embodiments may overlay a webmail interfaces. A significant number of people rely solely on web-based email. As noted, this presents several challenges for an encrypted email solution including: 1. viewing an email message without disclosing its contents to the email provider; 2. authoring an email message without disclosing its contents to the email provider; and 3. seamless integration. Unlike a local email client, a web-based client interface is under the complete control of the email provider. Anything on a web page should be assumed to be accessible to the email provider. Therefore, decrypting a message and displaying it via the web interface potentially leaks the message contents to the email provider. To prevent this, a web browser is extended to support an overlay that is placed on top of the usual interface. As this overlay is part of the web browser interface and not a web page, its contents are inaccessible to the email provider. This enables the secure viewing of a message, while keeping the email provider's copy in its encrypted state. A similar overlay is also leveraged to enable secure message authoring. The use of an overlay enables a tight integration with the webmail interface and facilitates a seamless experience. As encrypted messages can be stored at a webmail service indefinitely, the ability of the key server to dynamically generate sender-recipient keys helps keep the costs of the key server down as it does not have to store message-specific information.

While the preceding examples are directed primarily to overlaying email applications, it should be appreciated that the concepts above can be extended to other applications as well. For example, an on-line provider may provide other interfaces such as word processing interfaces, spreadsheet interfaces, or other interfaces provided using web page code. Embodiments may be practiced where browser-based interfaces are overlaid over all or a portion of the web page code based interface. However, in some such embodiments, it may be necessary to provide advanced functionality to the overlay. For example, the browser-based interface may need to support spreadsheet calculation functionality, formatting functionality, or other functionality.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Having described various embodiments with illustrative examples, a number of specific algorithmic steps for encryption and decryption are now set forth. The following are merely examples of one very specific embodiment.

Encryption

1. Get sender key $k_s$ if not already cached.
2. Generate random nonce $\eta$
3. For each recipient derive $k_{s,r_s} = KDF_{k_s}(id_{r_x})$
4. Generate random message encryption key $k_{msg}$
5. Encrypt $k_{msg}$ for each recipient using the appropriate sender-recipient key $k_{s,r_x}^{enc}$:

(a) Derive $k_{s,r_s}^{enc} =$ $$KDF_{k_{s,r_x}}(\text{``enc''}, \eta)$$

(b) Derive $k_{s,r_s}^{id} =$ $$KDF_{k_{s,r_x}}(\text{``id''}, \eta)$$

(c) Compute key identifier:

$$MAC_{k^{id}_{s,r_x}}(id_{r_x})$$

(d) Encrypt $k_{msg}$:

$$E_{k^{enc}_{s,r_x}}(k_{msg})$$

(e) Add as a header—Encrypted-MessageKey:

$$< MAC_{k^{id}_{s,r_x}}(id_{r_x}) > : < E_{k^{enc}_{s,r_x}}(k_{msg}) >$$

6. Insert fake key identifiers (optional):
   (a) Generate ($R_{max}$-$R_{act}$) random identifiers (same length as $$MAC_{k^{id}_{s,r_x}}(id_{r_x}))$$

(b) Generate ($R_{max}$-$R_{act}$) random keys (same length as $$(E_{k^{enc}_{s,r_x}}(k_{msg}))$$

(c) Add as a header—Encrypted-MessageKey: <randomId>:<randomKey>
7. Encrypt message body and attachments: $C = E_{k_{msg}}(M)$
8. Compute ciphertext integrity:
   (a) Generate random message integrity key $k_{mac}$
   (b) Compute Ciphertext-integrity: $MAC_{k_{mac}}(C)$. Set its value in the message.
   (c) Encrypt $k_{mac}$ and $MAC_{k_{mac}}(C)$ for each recipient using the appropriate sender-recipient key $k_{s,r_x}^{mac}$:
      i. Derive $k_{s,r_x}^{mac}=$ $$KDF_{k_{s,r_x}}(\text{``mac''}, \eta)$$

ii. Encrypt $k_{mac}$ and Mac $k_{mac}(C)$:

$$MAC_{k_{mac}}(C): E_{k^{mac}_{s,r_x}}(k_{mac}, MAC_{k_{mac}}(C))$$

iii. Add value as a header—Ciphertext-integrity:

$$< MAC_{k^{id}_{s,r_x}}(id_{r_x}) > : < E_{k^{mac}_{s,r_x}}(k_{mac}, MAC_{k_{mac}}(C)) >$$

9. Insert fake ciphertext signatures (optional)
   (a) Generate ($R_{max}$-$R_{act}$) random value (same length as MAC output)
   (b) Set random values as headers—Ciphertext-integrity (use the same <randomId> values from Step 6): <randomId>:<random Value>
10. Set $id_x$, $\tau$, $\eta$, and the location of the KDC as headers in the packaged message, where $\tau$ represents a policy.

Decryption
1. Extract $id_s$, $\tau$, $\eta$, and the location of the KDC from message headers
2. Get sender-recipient key $K_{s,r}$ if not already cached
3. Derive purpose specific keys from $K_{s,r}$:
   (a) $K_{s,r}^{mac} = KDF_{k_{s,r}}(\text{``mac''}, \eta)$
   (b) $K_{s,r}^{enc} = KDF_{k_{s,r}}(\text{``enc''}, \eta)$
   (c) $K_{s,r}^{id} = KDF_{k_{s,r}}(\text{``id''}, \eta)$
4. Compute key identifier:

$$MAC_{k^{id}_{s,r_x}}(id_{r_x})$$

5. Verify ciphertext integrity
   a) Obtain encrypted $k_{mac}$ identified by the computed key identifier
   b) Decrypt $k_{mac}$ and $MAC_{k_{mac}}(C)$ using $K_{s,r}^{mac}$
   c) Compute Ciphertext-integrity: $MAC_{k_{mac}}(C)$ and compare it to the value set in the message and the value decrypted using $K_{s,r}^{mac}$.
6. Extract and decrypt message encryption key $K_{msg}$:
   a) Find the encrypted message key $$(E_{k^{enc}_{s,r}}(k_{msg}))$$

using the computed key identifier
   Decrypt $$E_{k^{enc}_{s,r_x}}(k_{msg})$$

using $K_{s,r_x}^{enc}$ to get $k_{msg}$
7. Decrypt C with $k_{msg}$ to get M

The following illustrates high level depiction of a message structure in one embodiment of an encrypted email:

| ContentInfo |
|---|
| AuthenticatedData<br>1. Message attributes (sender, nonce, time, kdcURL)<br>2. EnvelopedData MAC (mac) using message-authentication key $\kappa_{mac}$<br>3. For each ciphertext recipient: $E_{K_{s,r}^{mac}}(\kappa_{mac},\text{mac})$<br>   (a) Each recipient is identified by: $MAC_{K_{s,r}^{id}}(id_r)$<br>4. EnvelopedData (see below)<br>   EnvelopedData (i.e., encrypted message wrapper)<br>     1. For each plaintext recipient: $E_{K_{s,r}^{enc}}(\kappa_{msg})$<br>       (a) Each recipient is identified by: $MAC_{K_{s,r}^{id}}(id_r)$<br>     2. The MIME message encrypted with $\kappa_{msg}$ (see below)<br>       Encrypted MIME message<br>       $E_{\kappa_{msg}}(M)$ |

The following illustrates a detailed mail structure in one embodiment:

| ContentInfo ::= SEQUENCE |
|---|
| 1. contentType ::= OBJECT IDENTIFIER<br>2. content ::= OCTET STRING (AuthenticatedData, see below)<br>   AuthenticatedData ::= SEQUENCE<br>     1. CMSVersion ::= INTEGER<br>     2. RecipientInfos ::= SET SIZE (1..MAX) OF RecipientInfo<br>       (One for each ciphertext recipient) |

```
                    -continued
─────────────────────────────────────────────────────
                  ContentInfo ::= SEQUENCE
─────────────────────────────────────────────────────
    RecipientInfo ::= CHOICE (ori)
    OtherRecipientInfo ::= SEQUENCE
       (a) oriType ::= OBJECT IDENTIFIER
       (b) oriValue ::= OCTET STRING (KAMEKRecipientInfo)
          KAMEKRecipientInfo ::= SEQUENCE
             i. keyIdentifier ::= OCTET STRING
             ii. keyEncryptionAlgorithm ::= (From X.509)
             iii. encryptedKeyAndMac ::= OCTET STRING
                encryptedKeyAndMac ::= SEQUENCE
                   A. key ::= OCTET STRING
                   B. mac ::= OCTET STRING
       3. MessageAuthenticationCodeAlgorithm ::= OCTET STRING
       4. EncapsultatedContentInfo := OCTET STRING
          EncapsultatedContentInfo := SEQUENCE
             (a) eContentType ::= OBJECT IDENTIFIER
             (b) eContent ::= OCTET STRING (EnvelopedData, below)
                EnvelopedData ::= SEQUENCE
                   i. CMSVersion ::= INTEGER
                   ii. RecipientInfos
                      (One for each plaintext recipient)
                      RecipientInfo ::= CHOICE (kekri)
                      KEKRecipientInfo ::= SEQUENCE
                         A. KEKIdentifier
                            (keyIdentifier ::= OCTET STRING)
                         B. keyEncryptionAlgorithm ::= (from
                            X.509)
                         C. EncryptedKey ::= OCTET STRING
                   iii. EncryptedContentInfo ::= OCTET STRING
                      EncryptedContentInfo ::= SEQUENCE
                         A. contentType ::= OBJECT IDENTIFIER
                         B. ContentEncryptionAlgorithmIdentifier
                            ::= (from X.509)
                         C. EncryptedContent ::= OCTET STRING
                            (plaintext MIME message)
       5. MessageAuthenticationCode ::= OCTET STRING
       6. UnauthAttributes ::= SET SIZE(1..MAX) of Attribute
          (SecurMail needs: sender, nonce, time, kdcURL)
             (a) Attribute ::= SEQUENCE
                i. attrType ::= OBJECT IDENTIFIER
                ii. attrValue SET OF ANY
─────────────────────────────────────────────────────
```

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a web browser in a computing system, a method of sending a secure email via an email server, the method comprising:
   receiving user input requesting a compose email page user interface for a web-based email system;
   requesting the compose email page user interface from a server for the web-based mail system;
   receiving web page code from the server for the compose email page user interface;
   parsing the web page code for the compose email page user interface to determine screen locations of one or more user input interface elements including at least an email text box user input interface element;
   rendering the compose email page user interface in the browser, the compose email page user interface configured to receive plain text user input from a user;
   overlaying one or more browser-based user interface elements implemented integral to the browser and separate from the web page code from the server onto the compose email page user interface, wherein one or more of the browser-based interface elements are displayed at one or more of the determined screen locations, including overlaying a browser-based text box user input interface element over the email text box user input interface element;
   receiving unencrypted plain text user input in the overlaid browser-based text box user input interface element, wherein the unencrypted plain text user input is not available to the email server ;
   encrypting the unencrypted plain text user input received in the overlaid browser-based text box user input interface element to encrypted text, wherein encrypting the plain text user input comprises:
      sending a request to a key server for a sender key, wherein the request includes an identification of an entity sending the secure email;
      receiving a sender key, the sender key being derived from a master secret key and the identification of the entity sending the secure email;
      generating a sender-recipient key using the sender key and an identification of a recipient of the secure email;
      deriving an encryption key using the sender-recipient key; and
      using the encryption key, encrypting the user input received in the overlaid browser-based text box user input interface element;
   transferring the encrypted text from the overlaid browser-based text box user input interface element into the email text box user input interface element overlaid by the browser-based text box user input interface element;
   sending the secure email comprising the transferred encrypted text to an intended recipient via an email server; and
   wherein the email server is unable to decrypt the encrypted text.

2. The method of claim 1 further comprising modifying input into at least one of a subject line user interface element of the compose email page user interface, a to field user interface element of the compose email page user interface, a from field user interface element of the compose email page user interface; a cc field user interface element of the compose email page user interface or the email text box user input interface element of the compose email page user interface to indicate that a secure email is being sent.

3. The method of claim 1, further comprising:
   using the sender-recipient key to generate a plurality of purpose specific keys, including a method authentication code key, and a key identifier key;
   using the method authentication code key to provide integrity to both encrypted text and plaintext in the email; and
   using the key identifier key to create a keyed fingerprint of a recipient's identifier.

4. The method of claim 1, wherein the one or more browser-based user interface elements are implemented integral to the browser through the use of a browser plug-in.

5. The method of claim 1, wherein transferring the encrypted text from the overlaid browser-based text box user input interface element occurs periodically as user input is received in the browser-based text box user interface element to allow auto saving of an encrypted draft at a web-based mail system server.

6. The method of claim 1, further comprising periodically, locally caching a plain text copy of the user input received in the browser-based text box user interface element.

7. The method of claim 1, wherein overlaying one or more browser-based user interface elements implemented integral to the browser and separate from the web page code from the server onto the compose email page user interface, wherein one or more of the browser-based interface elements are displayed at one or more of the determined screen locations, comprises overlaying one or more of a subject line user interface element of the compose email page user interface or an attachments interface element of the compose email page user interface.

8. The method of claim 1, wherein overlaying one or more browser-based user interface elements implemented integral to the browser and separate from the web page code from the server onto the compose email page user interface, wherein one or more of the browser-based interface elements are displayed at one or more of the determined screen locations comprises, overlaying one or more of a to field user interface of the compose email page user interface, a cc field user interface of the compose email page user interface, or a bcc field user interface of the compose email page user interface.

9. The method of claim 1, wherein overlaying one or more browser-based user interface elements implemented integral to the browser and separate from the web page code from the server onto the compose email page user interface, wherein one or more of the browser-based interface elements are displayed at one or more of the determined screen locations is performed in response to user input indicating a desire to send a secure email.

10. The method of claim 1, wherein overlaying one or more browser-based user interface elements implemented integral to the browser and separate from the web page code from the server onto the compose email page user interface, wherein one or more of the browser-based interface elements are displayed at one or more of the determined screen locations is performed as a default behavior.

11. In a computing system, a system for sending a secure email via an email server, the system comprising:
  one or more processors;
  one or more computer readable media coupled to the one or more processors, wherein the one or more computer readable media comprise computer executable instructions that when executed by the one or more processors cause the one or more processors to perform the following:
    receiving user input requesting a compose email page user interface for a web-based email system;
    requesting the compose email page user interface from a server for the web-based mail system;
    receiving web page code from the server for the compose email page user interface;
    parsing the web page code for the compose email page user interface to determine screen locations of one or more user input interface elements including at least an email text box user input interface element;
    rendering the compose email page user interface in the browser, the compose email page user interface configured to receive plain text user input from a user;
    overlaying one or more browser-based user interface elements implemented integral to the browser and separate from the web page code from the server onto the compose email page user interface, wherein one or more of the browser-based interface elements are displayed at one or more of the determined screen locations, including overlaying a browser-based text box user input interface element over the email text box user input interface element;
    receiving unencrypted plain text user input in the overlaid browser-based text box user input interface element, wherein the unencrypted plain text user input is not available to the email server;
    encrypting the unencrypted plain text user input received in the overlaid browser-based text box user input interface element to encrypted text, wherein encrypting the plain text user input comprises:
      sending a request to a key server for a sender key, wherein the request includes an identification of an entity sending the secure email;
      receiving a sender key, the sender key being derived from a master secret key and the identification of the entity sending the secure email;
      generating a sender-recipient key using the sender key and an identification of a recipient of the secure email; deriving an encryption key using the sender-recipient key; and
      using the encryption key, encrypting the user input received in the overlaid browser-based text box user input interface element;
    transferring the encrypted text from the overlaid browser-based text box user input interface element into the email text box user input interface element overlaid by the browser-based text box user input interface element;
    sending the secure email comprising the transferred encrypted text to an intended recipient via an email server; and
    wherein the email server is unable to decrypt the encrypted text.

12. A computer program product for sending a secure email via an email server, the computer program product comprising a non-transitory computer readable device, the computer readable device comprising computer executable instructions that when executed by one or more processors cause the one or more processors to perform the following:
  receiving user input requesting a compose email page user interface for a web-based email system;
  requesting the compose email page user interface from a server for the web-based mail system;
  receiving web page code from the server for the compose email page user interface;
  parsing the web page code for the compose email page user interface to determine screen locations of one or more user input interface elements including at least an email text box user input interface element;
  rendering the compose email page user interface in the browser, the compose email page user interface configured to receive plain text user input from a user;
  overlaying one or more browser-based user interface elements implemented integral to the browser and separate from the web page code from the server onto the compose email page user interface, wherein one or more of the browser-based interface elements are displayed at one or more of the determined screen locations, including overlaying a browser-based text box user input interface element over the email text box user input interface element;
  receiving unencrypted plain text user input in the overlaid browser-based text box user input interface element, wherein the unencrypted plain text user input is not available to the email server;
  encrypting the unencrypted plain text user input received in the overlaid browser-based text box user input interface element to encrypted text, wherein encrypting the plain text user input comprises:
    sending a request to a key server for a sender key, wherein the request includes an identification of an entity sending the secure email;

receiving a sender key, the sender key being derived from a master secret key and the identification of the entity sending the secure email;

generating a sender-recipient key using the sender key and an identification of a recipient of the secure email;

deriving an encryption key using the sender-recipient key; and using the encryption key, encrypting the user input received in the overlaid browser-based text box user input interface element;

transferring the encrypted text from the overlaid browser-based text box user input interface element into the email text box user input interface element overlaid by the browser-based text box user input interface element;

sending the secure email comprising the transferred encrypted text to an intended recipient via an email server; and wherein the email server is unable to decrypt the encrypted text.

* * * * *